(No Model.)
J. C. McNABB.
STOP COCK FOR AIR BRAKE SYSTEMS.
No. 523,081. Patented July 17, 1894.
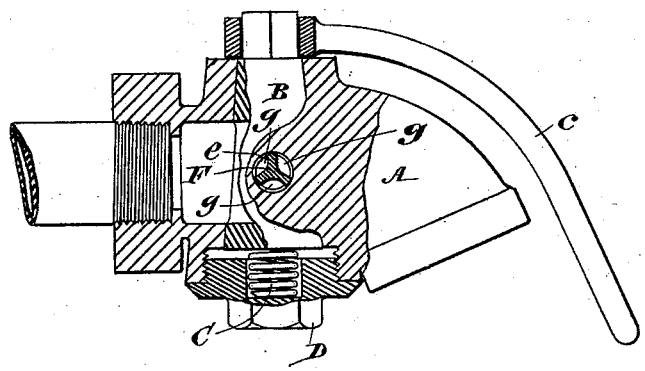
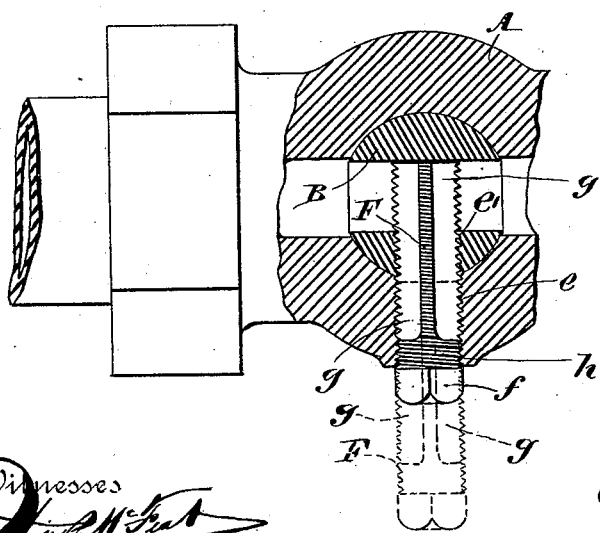

UNITED STATES PATENT OFFICE.

JAMES CONSTANT McNABB, OF MONTREAL, CANADA.

STOP-COCK FOR AIR-BRAKE SYSTEMS.

SPECIFICATION forming part of Letters Patent No. 523,081, dated July 17, 1894.

Application filed July 18, 1893. Serial No. 480,851. (No model.)

*To all whom it may concern:*

Be it known that I, JAMES CONSTANT MC-NABB, of the city of Montreal, in the district of Montreal and Province of Quebec, Canada, have invented certain new and useful Improvements in Stop-Cocks; and I do hereby declare that the following is a full, clear, and exact description of the same.

This invention relates to stop cocks applicable to railway air brake systems and more particularly the angle cocks thereof, the object being to provide means which will prevent any tampering with the cocks that could have serious consequences or, as it might be otherwise expressed, to nullify the evil effects of any interference therewith as by closing the valve of an angle cock and thereby cutting off the driver's control of the brakes.

The invention may be said to consist in the construction of a stop cock with a locking device or movable parts to prevent the movement of the valve of the cock, the unlocking of which device will effect the escape of the air, or other operative medium, and consequent application of the brakes so that all danger is averted by the interference being made known. For full comprehension however of the invention, reference must be had to the annexed drawings forming a part of this specification, in which like symbols indicate corresponding parts, and wherein—

Figure 1 is a side elevation broken away of an angle cock with rotatable valve to which my locking device is applied and Fig. 2 an enlarged horizontal section of the same, also broken away.

I have chosen to show my invention applied to this form of stop cock for the reason that its efficacy will in such a connection be more readily apparent but it is equally applicable to all cocks for similar purposes.

A is the outer casing of the usual form of an angle cock of the Westinghouse air brake system, B its usual tapered valve with supporting spring C and handle c and D the usual recessed nut cap acting to hold the spring and valve or plug in place, these however forming no part of my invention.

To carry out my invention in connection with this form of stop cock a lateral screw threaded opening e is made through the side of the casing A and another opening e', also screw-threaded, through the side of valve B adjoining and in these openings the locking device preferably in the form of a plug F is located, its construction resembling a nut headed bolt with nut head f, a body having three channels g g g along its surface extending from its inner end to within such a distance of the head as will leave an intact or complete portion h sufficient to secure a thoroughly air tight joint when the plug is in its proper place, i. e. engaging and preventing any movement of the valve B. It will thus be apparent that before the valve can be moved in any way the plug must be withdrawn free of it and the channels g are made of such a length that ere the inner end of the plug has become disengaged from the valve an exhaust has been provided for the air through the three channels g thus effectively preventing any ill consequences that might arise from the valve being shut without the locomotive driver's knowledge.

While I have shown my locking device in the form of a plug working through an aperture in the valve casing yet I do not wish to be confined to such an arrangement as I consider any movable part adapted when in one position to lock the valve against movement and by change of position to secure the escape of the fluid controlled by such valve without any movement of this latter, as coming within the principle and scope of my invention.

The channels g being formed in the plug and the escape of the fluid thereby, when it is moved the required distance, impart to it a valvular character and function which is an important feature of my invention.

What I claim is as follows:

1. In a stop cock, a movable locking device adapted, when in one position, to lock the valve against movement and by change of position, to secure the escape of the fluid controlled by such valve without any movement of the latter.

2. In a stop cock, a movable locking device in the form of a plug working through an opening in the cock casing, constructed with such an opening, and adapted upon movement in one direction to engage and hold against movement the valve proper, constructed to receive it, and, by movement in the direction required, to release the valve proper, securing the escape of said fluid before such valve is released.

3. In a stop cock, a movable locking device in the form of a channeled plug adapted when in one position relatively to the valve proper to lock same against movement and by change of position to secure the escape of the fluid controlled by such valve proper through itself.

4. In a stop cock, the combination with the plug thereof controlling the passage of a fluid or like operative medium and suitable posts,— of a movable locking device in the form of a plug channeled for a portion of its length, screw threaded to work in or through a correspondingly screw threaded opening in the cock casing, having such opening, and adapted upon movement inwardly to enter an opening in the cock plug so as to hold it against movement and by outward movement to effect an exhaust of the fluid controlled by said valve into the open air by way of such channeling before freeing the cock plug as set forth.

Montreal, July 12, 1893.

JAMES CONSTANT McNABB.

In presence of—
    WILL P. McFEAT,
    FRED. J. SEARS.